(12) United States Patent
Quesada et al.

(10) Patent No.: US 12,510,201 B2
(45) Date of Patent: Dec. 30, 2025

(54) CLICK FIT RESTRAINED PIPE JOINING SYSTEM FOR PLASTIC PIPE

(71) Applicant: S&B Technical Products, Inc., Fort Worth, TX (US)

(72) Inventors: Guido Quesada, Santa Ana (CR); Mark A. Weih, San Jose (CR); Sam Gjorven, Williston, ND (US)

(73) Assignee: S&B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 18/888,685

(22) Filed: Sep. 18, 2024

(65) Prior Publication Data
US 2025/0327543 A1    Oct. 23, 2025

Related U.S. Application Data

(60) Provisional application No. 63/635,903, filed on Apr. 18, 2024.

(51) Int. Cl.
*F16L 47/08* (2006.01)
*F16L 21/03* (2006.01)

(52) U.S. Cl.
CPC .............. *F16L 47/08* (2013.01); *F16L 21/03* (2013.01)

(58) Field of Classification Search
CPC . F16L 47/08; F16L 47/10; F16L 47/12; F16L 21/03
See application file for complete search history.

(56) References Cited

U.S. PATENT DOCUMENTS

| | | | |
|---|---|---|---|
| 4,600,222 A | 7/1986 | Appling | |
| 5,662,360 A | 9/1997 | Guzowski | |
| 5,988,692 A | 11/1999 | Springer | |
| 6,325,424 B1 | 12/2001 | Metcalfe et al. | |
| 7,108,295 B1 | 9/2006 | Zarynow | |
| 7,284,310 B2 * | 10/2007 | Jones | F16L 47/08 |
| 7,328,493 B2 | 2/2008 | Jones et al. | |
| 7,537,248 B2 | 5/2009 | Jones et al. | |
| 8,444,186 B2 * | 5/2013 | Jones | F16L 37/0925 |
| 10,584,820 B2 | 3/2020 | Williams et al. | |
| 2009/0152863 A1 * | 6/2009 | Steinbruck | F16L 37/148 |
| 2010/0007139 A1 | 1/2010 | Pirotin | |
| 2011/0254266 A1 | 10/2011 | Guzowski et al. | |
| 2016/0245435 A1 * | 8/2016 | Corbett, Jr | F16L 47/08 |
| 2021/0215287 A1 | 7/2021 | Wells et al. | |
| 2021/0324987 A1 | 10/2021 | Jordan et al. | |
| 2022/0163156 A1 | 5/2022 | Wells et al. | |

\* cited by examiner

*Primary Examiner* — Zachary T Dragicevich
(74) *Attorney, Agent, or Firm* — Charles D. Gunter, Jr.

(57) ABSTRACT

A restrained pipe joining system for plastic pipe is shown comprising male and female pipe ends, the male pipe end having an external circumferential groove and the female pipe end having an internal recess which contains a circumferential casing element, the casing element receives a non-circular click fit restraint ring which engages the external circumferential groove of the male pipe end during the make-up of the pipe ends to form a sealed and restrained pipe joint.

17 Claims, 12 Drawing Sheets

CLICK FIT RESTRAINED PIPE JOINING SYSTEM FOR PLASTIC PIPE

CROSS-REFERENCE TO RELATED APPLICATIONS

The present application claims priority from a provisional application, Ser. No. 63/635,903, filed Apr. 18, 2024, entitled "Click Fit Restrained Pipe Joining System For Plastic Pipe," by the same inventors.

BACKGROUND OF THE INVENTION

1. Field of the Invention

The present invention relates generally to a restrained joint for coupling plastic pipe and, more specifically to such a restrained joint which utilizes a click or snap-fit mechanism to connect a male spigot pipe end to a mating female belled pipe end.

2. Description of the Prior Art

A variety of piping systems are known for the conveyance of fluids which employ elastomeric type sealing rings or gaskets. The pipes used in such systems may be formed of PVC, polyolefins such as PE and PP, ductile iron, concrete, clay, fiberglass, steel, cast iron, fiberglass/cement reinforced pipes and such metals as aluminum and copper. At the present time, pipes formed of thermoplastic materials, including PVC and polyethylene, are preferred for use in pipeline installations for below ground pressure piping such as might be encountered in municipal water systems as well as for low pressure or non-pressure pipelines such as those carrying sewage.

In forming a joint between thermoplastic sections of pipe of this general type, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the seal capacity for the joint. In many situations, it is also desirable to provide a "restrained joint" to insure the spigot or male pipe end and the female or socket end do not separate due to hydraulic forces that exist inside the pipeline, or due to other causes, such as ground movement and the like.

The need to restrain lengths of pipe coupled together in this general fashion exists not only with respect to municipal water lines, but in other diverse applications including well casings, directional drilling applications, laying of fiber optic cable, and above ground pressure piping applications. Over time, various solutions have been proposed for providing the needed restraining function for such applications.

In some of the above-described pipeline applications, it was desirable that the joint be air and water tight. For example, when pulling fiber optic cable through a conduit, it is a common practice to use air pressure to first blow a fine fish-string through the pipeline. Also, where electrical wire or fiber optic cable is located inside the pipeline, the pipeline joints need to prevent infiltration of ground water. In similar fashion, well casing applications need to prevent infiltration of percolated surface water that potentially contains contaminants. Municipal water and sewer lines must also remain water-tight for most usable applications. The "restrained joint" helps to maintain the sealing integrity of the coupled lengths of pipe in such pipelines. Additionally, the restraint joints are wanted in earthquake prone areas on both pressure water and sewage lines.

In the area of well casings and directional drilling applications using PVC pipe, one approach has been to use axially aligned circumferential grooves machined into the mouth region of the belled pipe end and into the exterior surface of the mating male, spigot pipe end. A port is drilled through the female bell to complete a circumferentially shaped, canal type passageway for receiving a locking spline or key strap which is subsequently passed through the bell wall, into the canal of the aligned grooves, and around the circumferential passageway.

A number of different variations of this general concept are known in the marketplace at the present time. For example, U.S. Pat. No. 6,352,288 shows a mechanical pipe connection that includes the feature of coupler recesses with cooperating locking grooves on the pipes. Other patents representative of the general state of the prior art describe various purported improvements to these basic concepts, while sharing the common element of machining one or more grooves into the inner mouth region of the belled pipe end and on the exterior surface of the spigot pipe end.

U.S. Pat. No. 7,845,686, assigned to the assignee of the present invention, describes a cooperating casing member and sealing member individually placed on a Rieber bellling mandrel. The patent cites advantages of this arrangement, for example, different seal designs can be placed in cooperation with the same casing design. The male and female pipe ends used in the system each have aligned circumferential grooves which form a canal for passage of a locking key strap. During manufacture, the female belled end is sequentially formed over a Rieber style gasket and then over a ring-shaped casing member having an inner circumferential groove formed on its inner circumferential surface.

Despite the various advances which have been made in the above-described technologies, a need continues to exist for an improved restrained joining system for joining two sections of plastic pipe which joints can withstand anticipated forces likely to be encountered in use.

For example, newer materials offer advantages of increased tensile strengths and other desirable attributes that were not achievable with traditional Nylon and PVC type pipe materials used in the past in joining component materials.

Also, there is a need for such a restraint system which operates in a click or snap-fit fashion, upon being actuated by the male pipe member during the assembly step, and which would not require spline openings to be machined in the host plastic pipe, thereby presenting the possibility of weakening the pipe.

A need also exists for such a pipe joining system which is economical to implement so that it does not greatly increase the cost or difficulty of manufacture of the piping system.

A need exists for a joining system for restrained joint which can meet the needs of such diverse plastic pipe conduit or pipeline applications as above ground temporary water lines, municipal water lines, forced water and sewer mains, earthquake prone areas, well casing applications and horizontal drilling applications.

SUMMARY OF THE INVENTION

Figure 1:
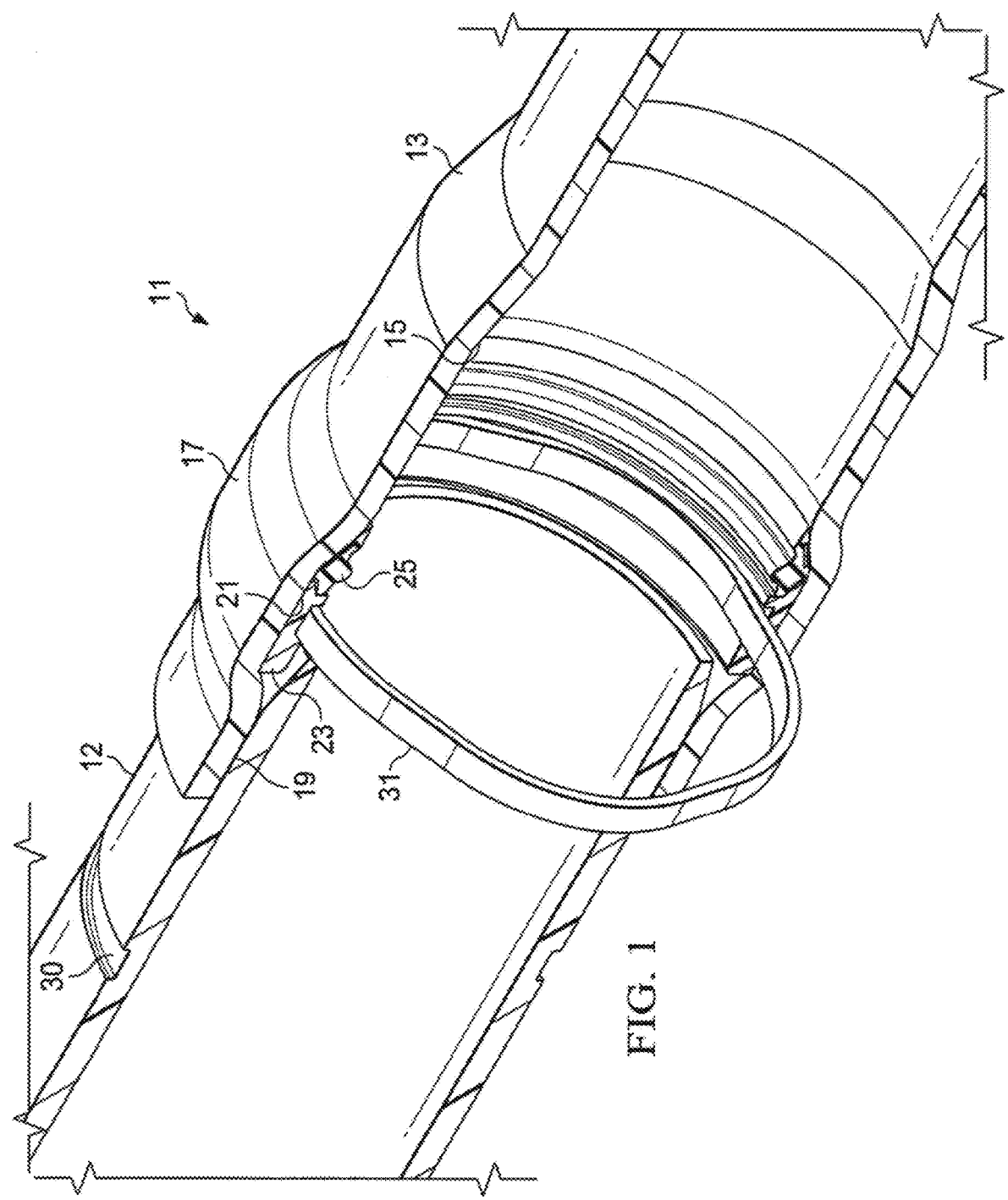
FIG. 1 is a partial, sectional view of a female belled pipe end having an internal raceway, with a ring-shaped casing and a co-located sealing ring received within the raceway, and showing the click-fit restraint ring which makes up a part of a restraint mechanism which is actuated when the male pipe member enters the mouth opening of the female belled pipe end.

The present invention is an improved joining system for joining two sections of plastic pipe. The pipe may be straight run piping, or may be a coupling or fitting, or other connection such as an elbow or tee. In the joining system of the invention, a first section of plastic pipe has a female, belled pipe end with an end opening. The belled pipe end has an exterior surface, an interior surface and a circumferential recess defining a raceway formed in the belled pipe end adjacent the end opening on the interior surface thereof. A second section of plastic pipe has a mating male plastic pipe end having an interior surface and exterior surface. The exterior surface has at least one groove formed at one circumferential location thereof which is alignable with the interior recess formed in the belled pipe end when the male pipe end is inserted within the mouth opening of the belled pipe end to form a joint.

A ring-shaped casing element is installed within the circumferential recess provided in the belled end of the first section of plastic pipe, the casing element having an inner circumferential surface and an outer circumferential surface and having at least one groove formed at one inner circumferential location on the inner circumferential surface thereof.

An associated sealing element is co-located within the circumferential recess provided in the first section of plastic pipe adjacent the casing element. The sealing element has an inner circumferential region and an outer circumferential region, the outer circumferential region being arranged to form a seal with the interior surface of the belled end while the inner circumferential region forms a sealing surface for the exterior surface of the mating male pipe section. The casing element and the sealing element can conveniently be installed on a Rieber belling mandrel and belled over in a plastic pipe manufacturing operation.

A click-fit restraint ring is located in the groove formed on the inner circumferential surface of the casing element. The click-fit restraint ring may be formed as a continuous ring or may be non-continuous with a gap at least one point in the circumference. The ring is actuated by contact with the male plastic pipe end as the pipe joint is made up to move between an initial relaxed state to an intermediate extended or expanded state, and finally to a collapsed state in which regions of the ring snap into place in the groove formed on the exterior surface of the male plastic pipe end to thereby restrain the male pipe end.

Preferably, the click-fit restraint ring is "non-circular" having an irregular outer circumferential profile. For example, in one version of the invention, the click-fit restraint ring has a wavy pattern formed by a plurality of lobes spaced about the periphery of the ring with selected outermost lobe regions of the ring locating themselves in the casing groove in the relaxed state. Contact between the outermost regions of the ring and the casing serve to keep it initially centered before contact with the male pipe end. Selected innermost regions of the ring are contacted by the spigot pipe end as the assembly process begins causing portions of the ring to be expanded outwardly. As the assembly proceeds, the innermost regions of the ring drop into the groove located on the male, spigot pipe end. This action of the restraint ring allows the movement of the spigot until the spline encounters the external wall of the casing groove, since the groove is wider than the spline. However, the described engagement prevents reverse relative movement of the spigot pipe end relative to the female, belled pipe end.

The casing may also be replaced by a groove with or without a ramp, the groove being, for example, machined directly into the PVC of the female bell end of the pipe, or the groove May also be formed directly into the PVC bell via a collapsible mandrel. Both versions of the invention can use the wavy or non-circular spline.

Additional objects, features and advantages will be apparent in the written description which follows.

DETAILED DESCRIPTION OF THE INVENTION

The present invention provides a product and process which meet the foregoing described objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

In a first aspect, the present invention deals with a plastic pipe manufacturing technique which manufacturing process produces an integrally formed recess or raceway in a female, belled pipe end which recess receives a casing element and a co-located sealing element. The casing element is a circumferential member having a groove formed on the inner circumference thereof. The casing groove is alignable with a circumferential groove which is provided on the exterior, outwardly facing surface of a mating male spigot pipe end. As has been briefly described, in the past, in order to provide a restrained pipe joint, a port was sometimes drilled through the female bell and through the casing to complete a circumferentially shaped, canal type passageway. This passageway was designed to receive a locking key strap which was subsequently passed through the bell wall, into the canal formed by the aligned grooves, and around the circumferential passageway.

While such manufacturing techniques have been used to form various pipe joining systems in the past, the present invention deals with improvements in the design of the component parts as well as with the materials used. Newer classes of materials have been found to provide the required tensile strengths and pull out resistance needed, as well as offering other advantages in pipe joints using these systems. One particular advantage is the eliminating the need to use a threaded spline or key strap, as was done in the past. It is not necessary to bore a hole in the female, belled pipe end for receiving a key strap, adding to the integrity of the assembly.

While the following discussion uses the example of two "pipe sections" being joined in a straight run of pipeline or conduit, it will be understood that the principles of the invention can also be used to form a restrained joint in a pipe coupling, fitting, or related application.

FIG. 1 is a partial sectional view of a first section of plastic pipe 11, typically formed of PVC, having an exterior surface 13, an interior surface 15, and having a female belled pipe end 17. The belled pipe end 17 has a mouth opening 19 and has a circumferential recess or raceway 21 integrally formed therein adjacent the mouth opening 19. The circumferential recess 21 houses the ring-shaped casing member 23 and a companion ring-shaped sealing element 25 used in the joining system of the invention.

As also shown in FIG. 1, the male, spigot pipe member has a circumferential groove 30 formed in the exterior surface thereof. The spigot groove 30 is aligned with the casing recess 21 during make-up of the pipe joint.

Figure 2:
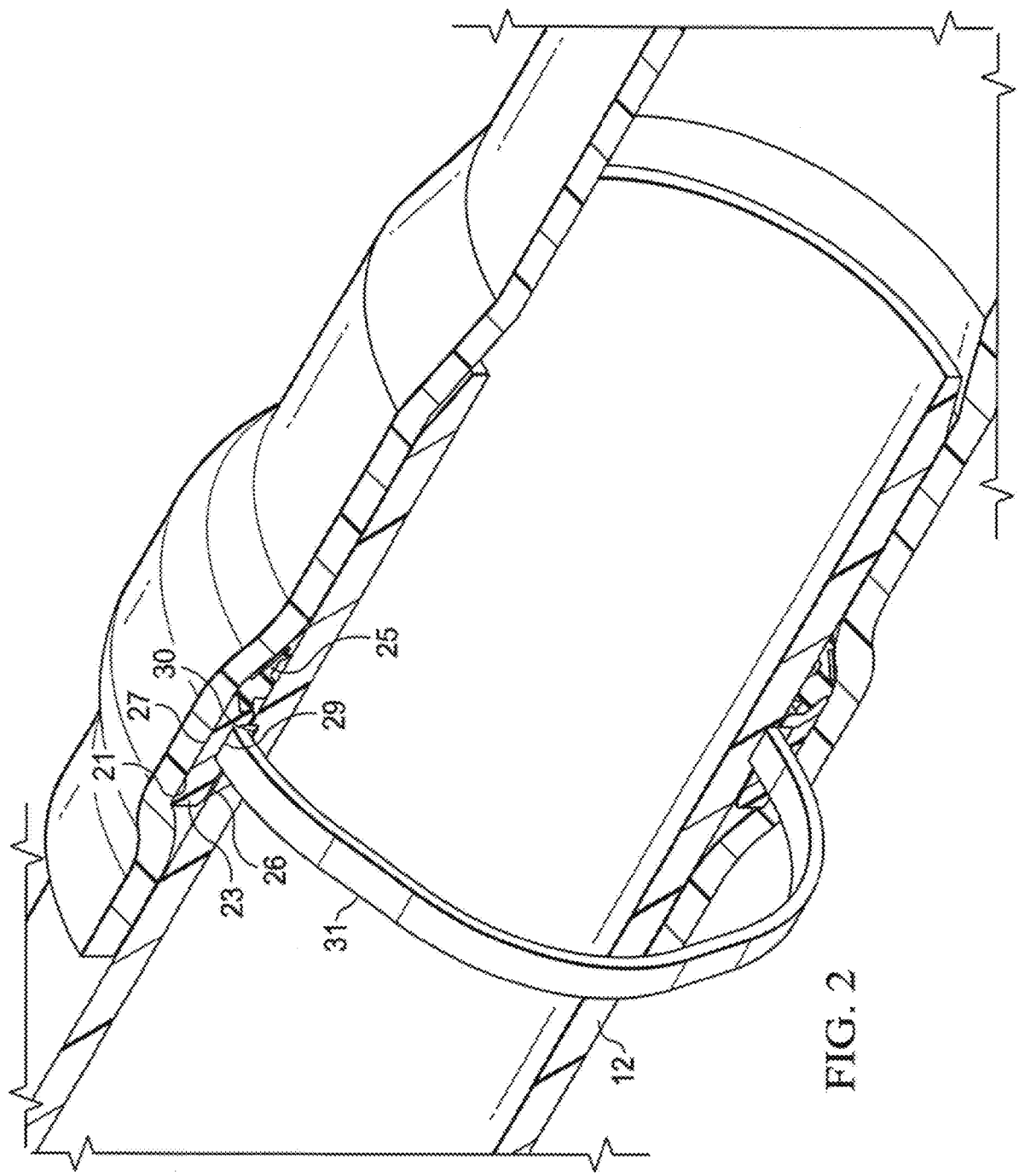
FIG. 2 is a partial, quarter sectional view of a pipe joint featuring the click-fit restraint mechanism of FIG. 1 showing the male, spigot pipe end fully inserted into the female, belled pipe end.

As shown in greater detail in FIG. 2, the ring-shaped casing member 23 has an inner circumferential surface 26 and an outer circumferential surface 27 and has at least one circumferential groove 29 formed at one inner circumferential location on the inner circumferential surface thereof. The groove 29 receives a special click-fit restraint ring 31, which will be described in greater detail in the description which follows. In the view shown in FIG. 1, the male, spigot pipe end 12 is just starting to enter the female, belled pipe end and is making initial contact with the click-fit restraint ring 31. In the view shown in FIG. 2, the male pipe end has been fully inserted to make up the completed sealed and restrained pipe joint.

As has been briefly mentioned, the casing element and sealing element can be installed on a Rieber belling mandrel and belled over in a plastic pipe manufacturing process. The Rieber belling process is described in U.S. Pat. No. 4,120,151, to Gunnar Parman, and similar references. The sealing ring and casing element are placed on a mandrel of a belling machine and a heated and softened pipe end is pushed up and over the trailing end of the sealing element continuing past the casing element. The heated pipe end is allowed to cool and the mandrel is retracted, leaving the sealing ring and casing situated inside the female bell pipe end. The Rieber process has been in commercial use since the early 1970's and will be familiar to those skilled in the relevant arts.

Figure 2A:
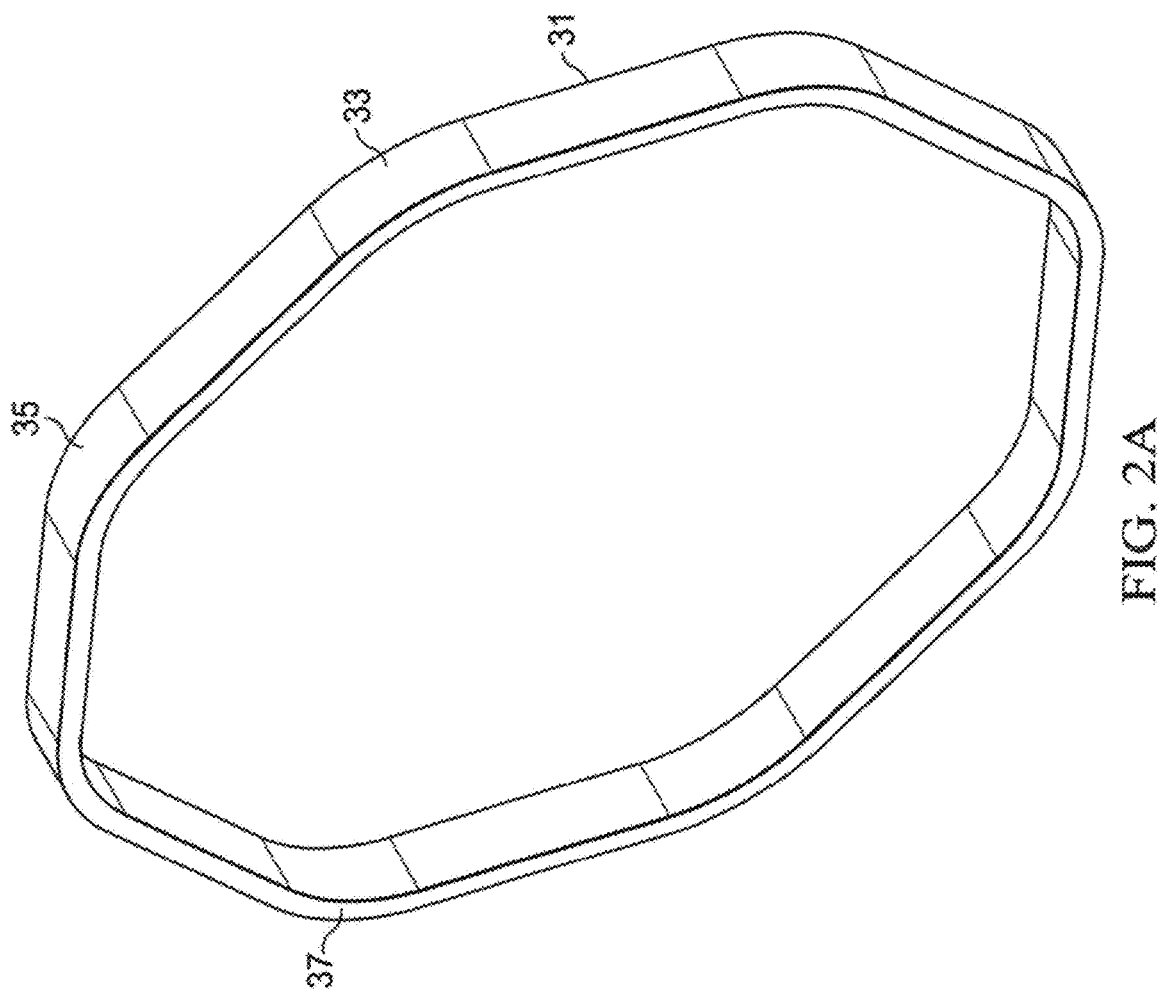
FIG. 2A is a top view of the click-fit restraint ring used in the click-fit restraint mechanism of FIG. 1, the spline having a wavy, non-circular shape.
Figure 5:
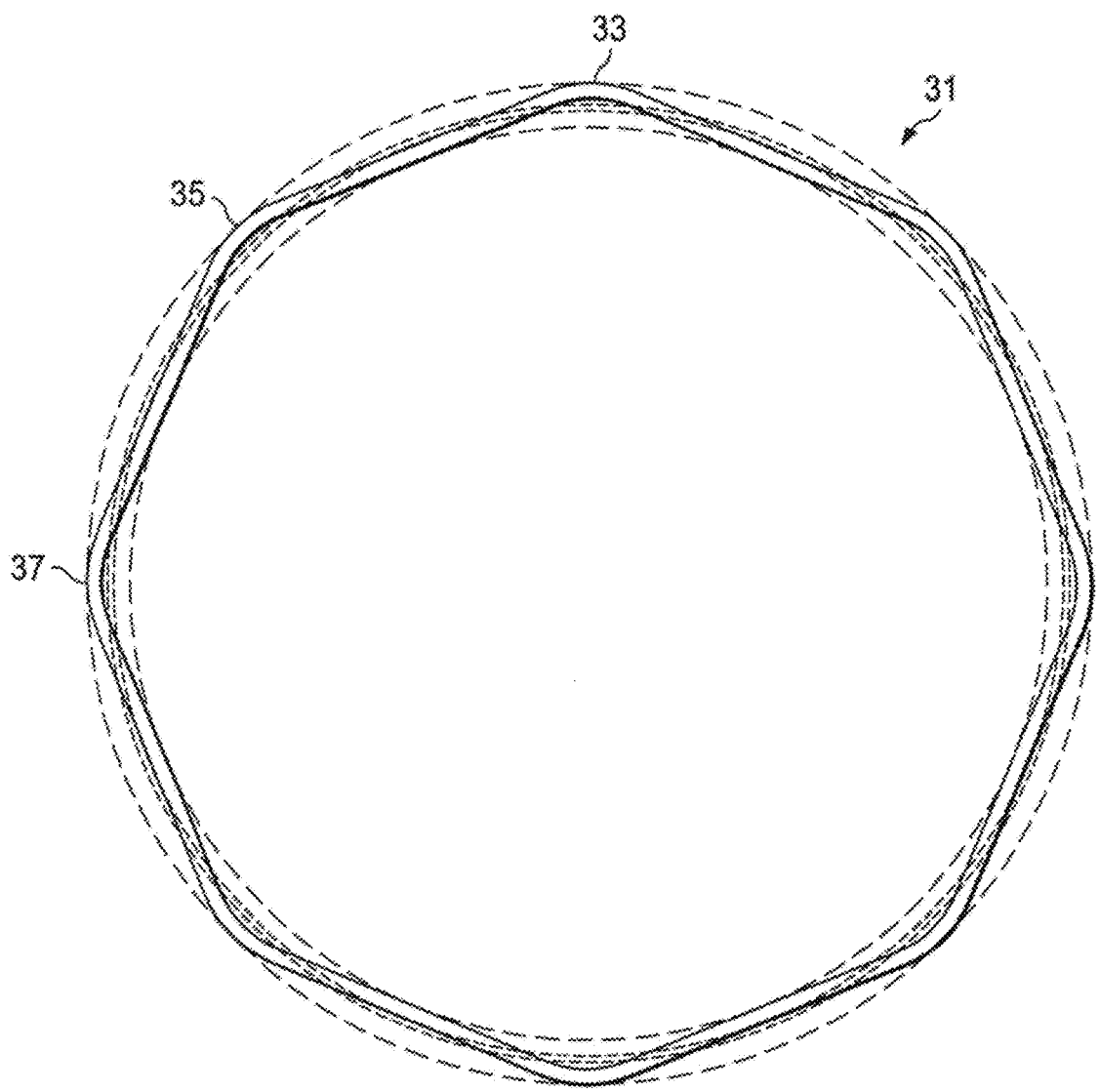
FIG. 5 is an enlarged top view of the click-fit restraint ring used in the restraint mechanism of the invention.
Figure 5A:
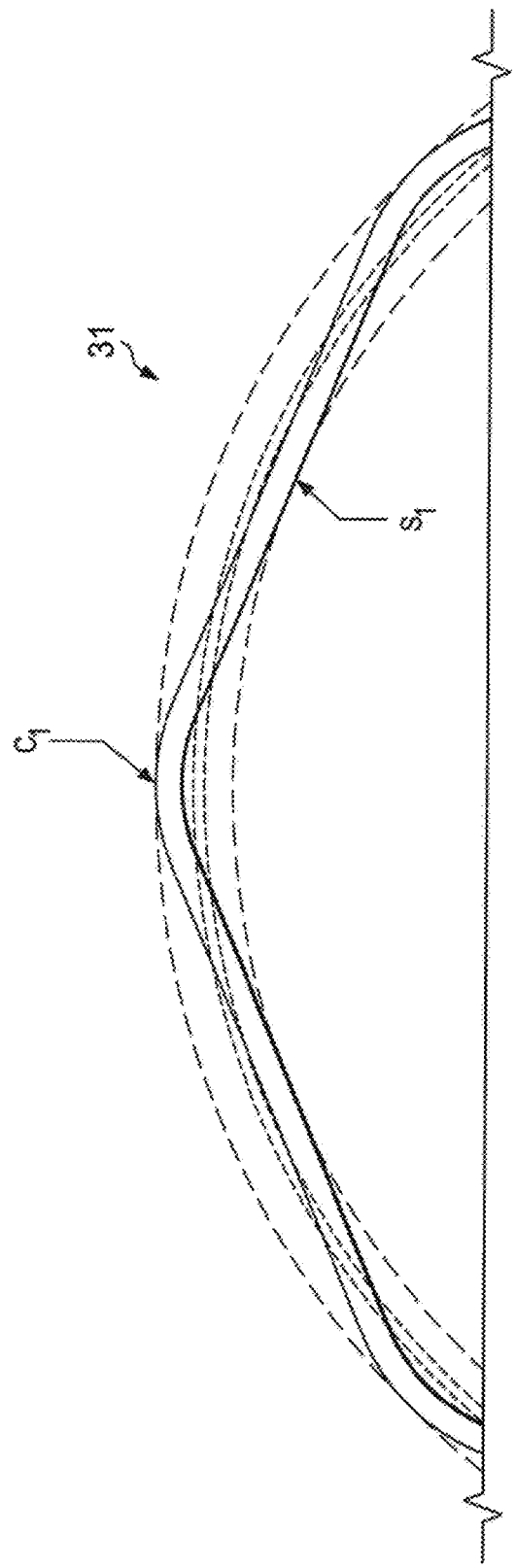
FIG. 5A is a partial, enlarged view of the click-fit restraint ring of FIG. 5, showing the wave portions which form a series of lobes on the circumference of the ring.
Figure 7:
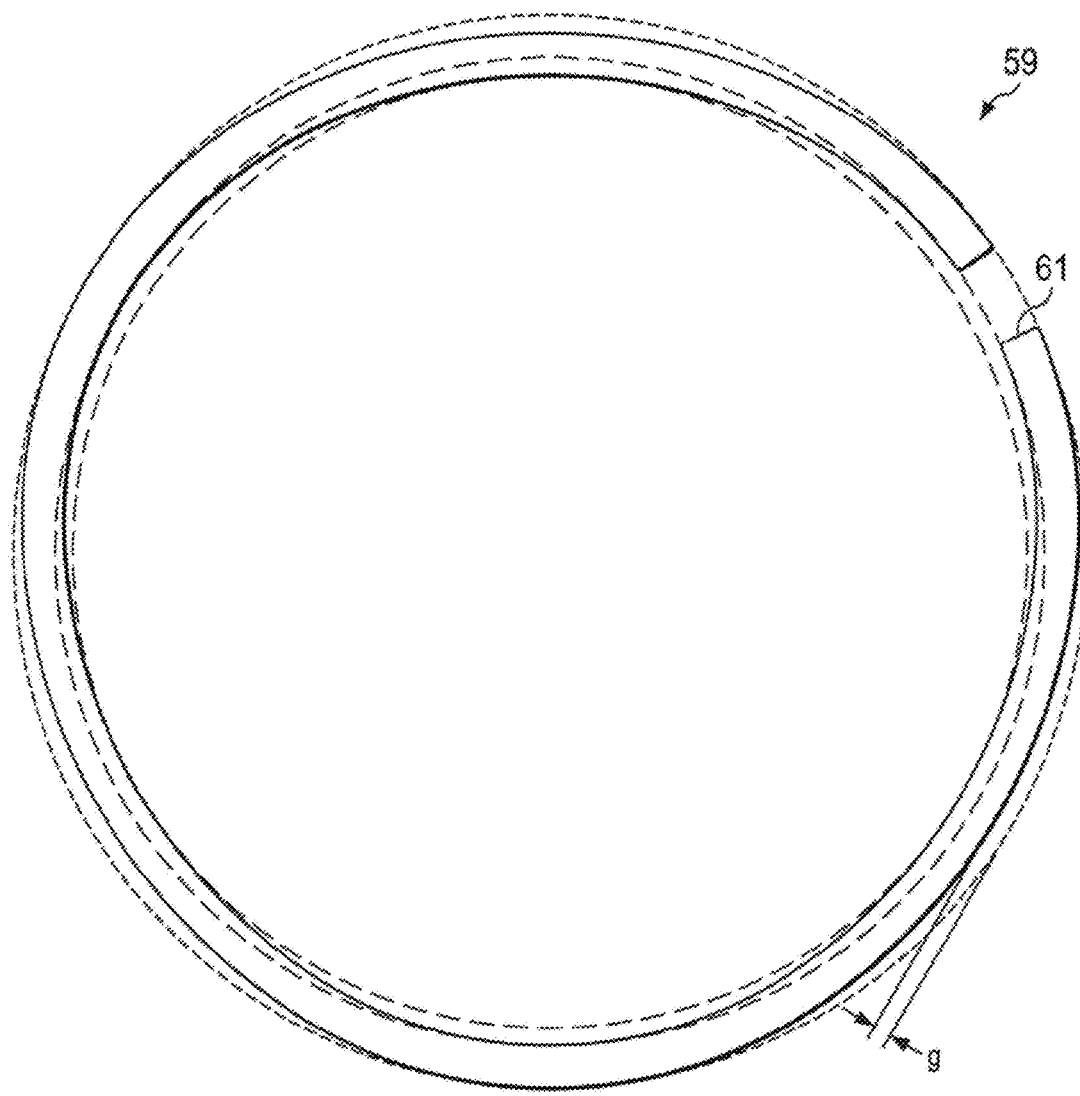
FIG. 7 is a top, perspective view of the click-fit restraint ring of FIG. 6.

As shown in FIG. 2A and in greater detail in FIGS. 5 and 5A, the click-fit restraint ring 31 can be a complete, continuous ring, but with a "non-circular" circumference, or the restraint ring can be a non-continuous circular "C-ring," as shown in FIG. 7. As indicated in FIG. 5A, the continuous, non-circular ring produces what might be thought of as 50% engagement or contact on either the casing, $C_1$ or the spigot, $S_1$. The non-circular circumference, or wavy shape of the click-fit ring 31, is produced by the wavy pattern shown in FIG. 2A with some regions (referred to as lobes) going into the casing raceways in the relaxed state, before assembly of the pipe joint. As a result, before assembly, the outer regions ($C_1$ in FIG. 5A) are in contact with the casing groove and keep the restraint ring 31 centered. When the spigot pipe end is inserted into the female, belled pipe end, the inner regions ($S_1$ in FIG. 5A) bend outwards to allow the spigot to enter. When the assembly is complete, the inner regions drop into the spigot groove (30 in FIGS. 1 and 2). The thus assembled pipe joint provides both push and pull engagement. A continuous ring also presents a very strong locking structure.

The "non-circular" nature of the click-fit ring 31 can perhaps best be appreciated with reference to FIGS. 2A, 5 and 5A. As briefly mentioned, the outer circumference of the ring has a plurality of waves or lobes, such as lobes 33, 35 and 37, which produce the wave like appearance. The fit of the lobes within the casing groove and within the groove on the spigot is illustrated pictorially in FIGS. 5 and 5A with lines representing the ring before engagement with the spigot and with lines representing the position of the ring after engagement.

Figure 3:
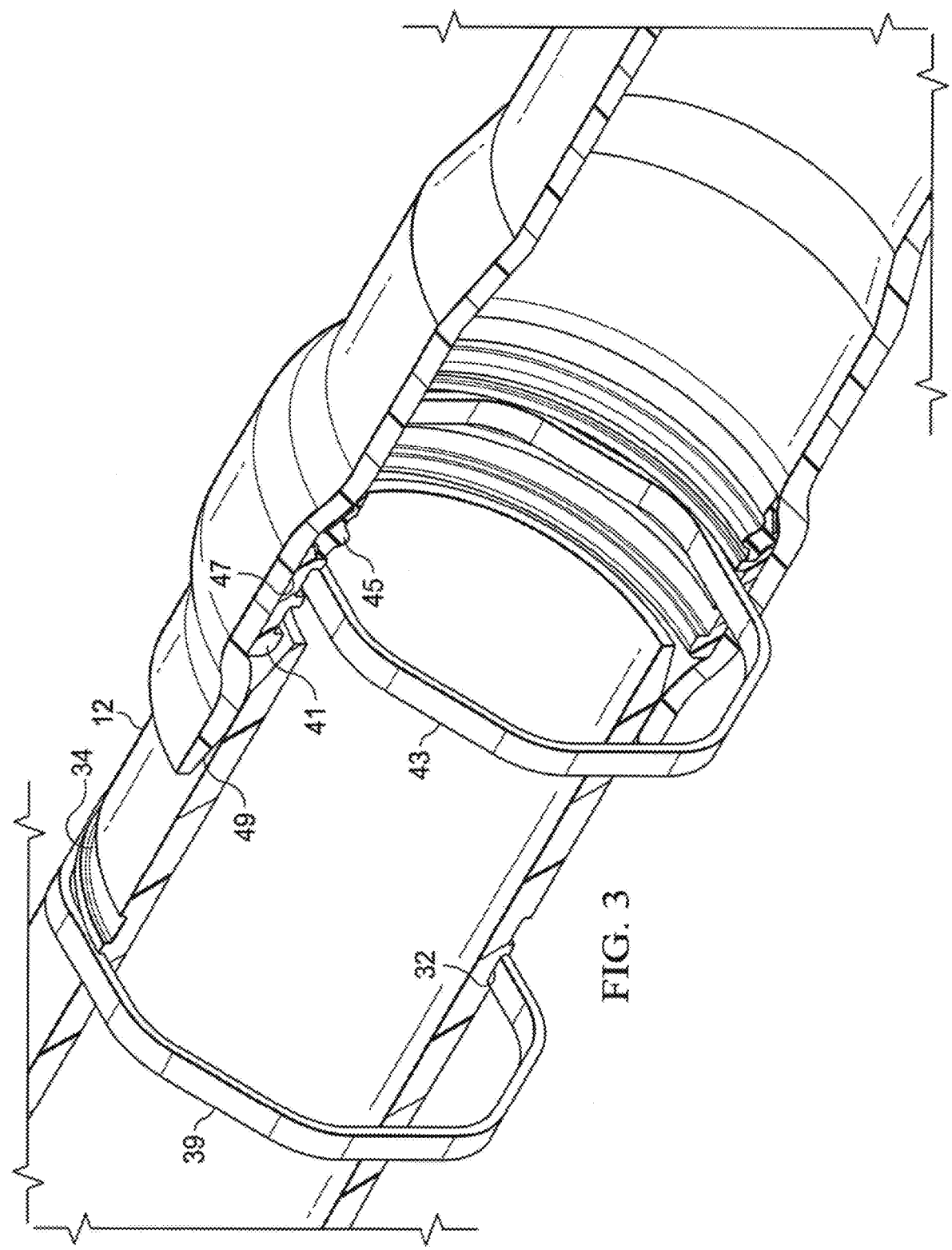
FIG. 3 is a partial, quarter sectional view, similar to FIG. 2, but showing a dual click-fit restraint ring arrangement, the mechanism being shown just prior to engagement with the male, spigot pipe end.
Figure 4:
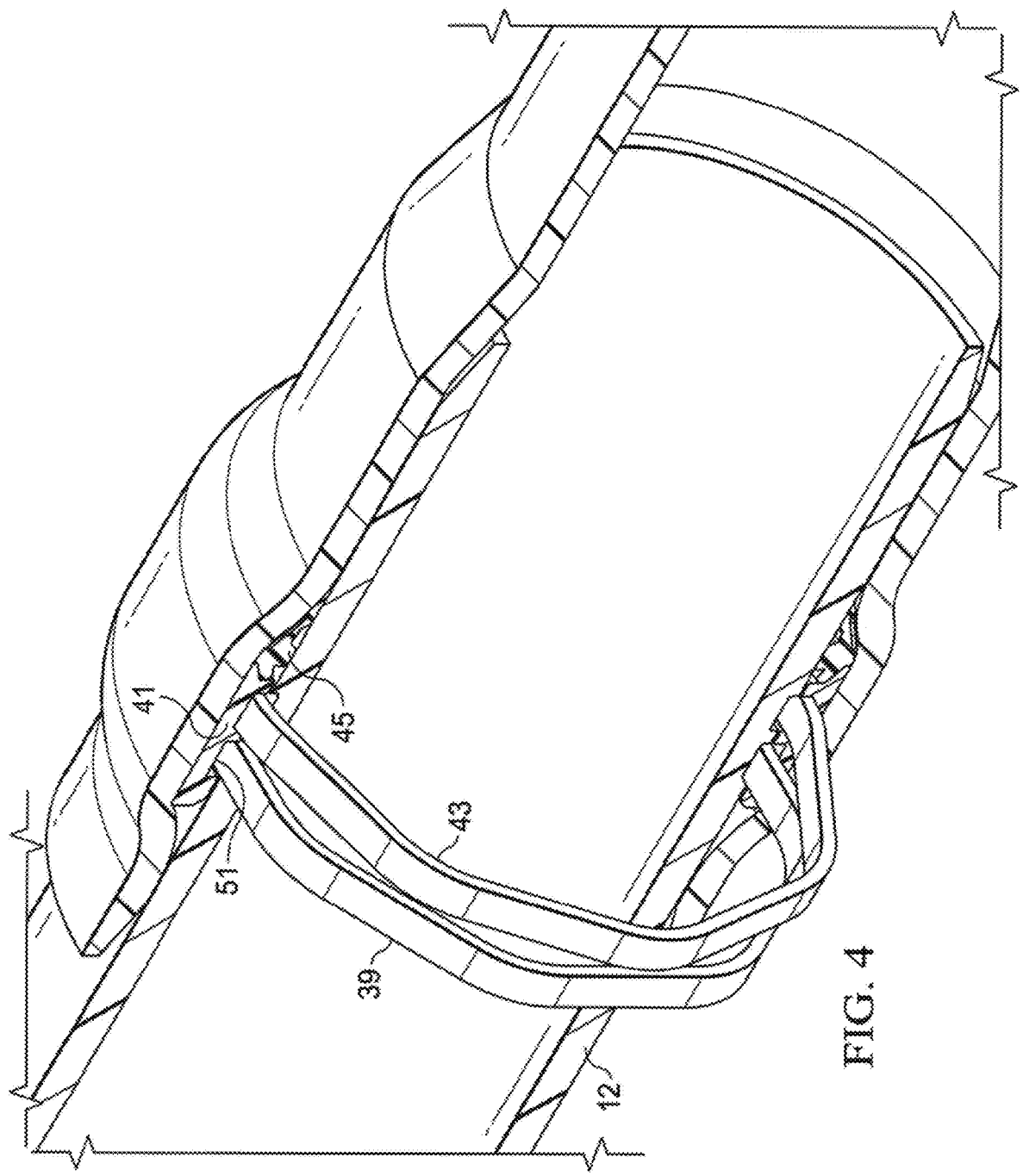
FIG. 4 is a view similar to FIG. 3, but showing the restraint mechanism after contact with the male, spigot pipe end.

As shown in FIGS. 3 and 4, instead of having a single restraint system, the joining system of the invention can include a pair of grooves 32, 34, formed on the exterior surface of the male pipe end. One of the grooves, 32, which is deeper to allow the compressed non-circular click-fit restraint ring 39, to pass below the inner diameter of the exterior pipe and casing. The system also has a casing element 41 located in the recess in the interior of the female belled pipe end, which casing element receives a second, non-circular click-fit restraint ring 43 in a second raceway formed on an inner circumferential surface thereof. There is also a sealing element 45 co-located in the female, belled pipe groove 47 for providing sealing contact with the male, spigot pipe end in the assembled pipe joint. The female pipe end may be provided with an assembly ramp, such as the ramp shown as 49 in FIG. 3.

FIG. 3 illustrates the position of the click-fit restraint rings 39 and 43 as the male pipe end is just beginning to enter the female pipe end. FIG. 4 shows the position of the rings after assembly. As was the case with the single restraint system, the pair of rings 39, 43 again have a non-circular, irregularly shaped circumferential profile. As previously described, selected regions of the casing restraint ring 43 are initially in contact with the casing to keep the ring centered. When the assembly is complete, the innermost regions of the casing ring 43 drop into the spigot groove 34, and the click ring on the spigot 39 snaps upward in the second groove of the casing 51. FIG. 4 shows the completed assembly with the restraint ring 39 located on the exterior of the spigot pipe end being received in the second groove 51 formed in the casing 41.

Figure 6:
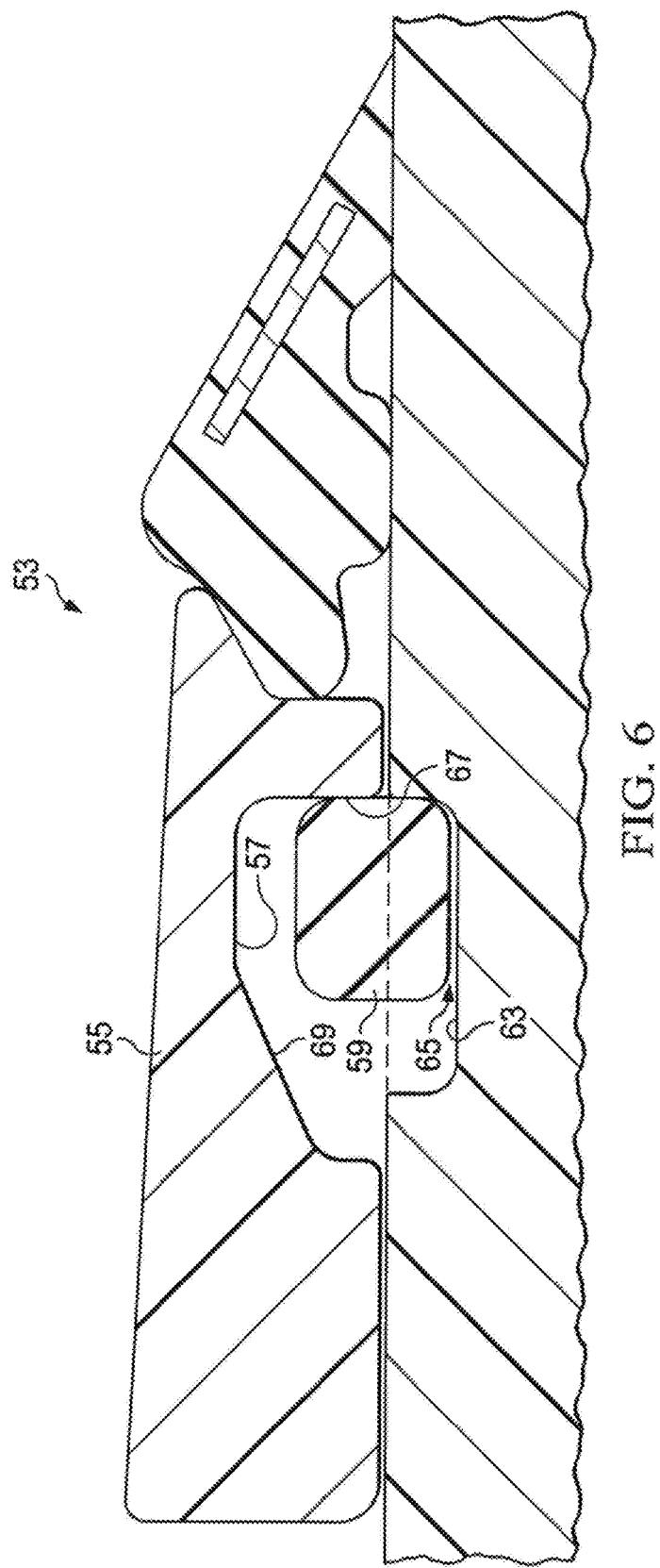
FIG. 6 is an isolated, partial sectional view of another version of the click-fit restraint mechanism of the invention, showing the click-fit ring within the casing located in the female, belled pipe end.

FIG. 6 shows another version of the click-fit restraint ring, designated generally as 53. The mechanism again features a circumferential casing 55 with a casing groove 57 located on the inner circumferential surface thereof. The groove 57 receives a click-fit restraint ring 59. As will be appreciated with respect to FIG. 7, the click-fit restraint ring 59 is, in this case, non-continuous, with an opening 61 at one point in the circumference thereof. It still has an irregular circumferential outline with, in this example, three "lobes," which create a gap "g" at spaced locations with respect to the surrounding casing 55.

The groove 63 (FIG. 6) provided on the male, spigot pipe end is wider and deeper (3.5 mm in one prototype) than the groove 30 shown in the version of the ring illustrated in FIGS. 1-3. The ring is appropriately sized so that a slight gap 65 exists with respect to the bottom wall of the pipe groove. The ring itself has an increased height, as compared to the ring of FIGS. 1-3. As will be further appreciated with respect to FIG. 6, the casing groove 57 is bounded by a downwardly extending, perpendicular wall portion 67 of the casing 55 on one side and by a downwardly sloping wall region 69 on the opposite side. The wall region 69 forms an approximate 24° ramp angle in the example shown.

As briefly mentioned, the separate casing piece may also be replaced by simple groove with or without a ramp which is machined directly into the PVC of the female bell end of the pipe, or this groove may also be formed directly into the PVC bell via a collapsible mandrel or other convenient technique. A non-continuous ring with lobes or portions that snap into a simple deeper groove in the casing could be used in this situation.

Figure 8:
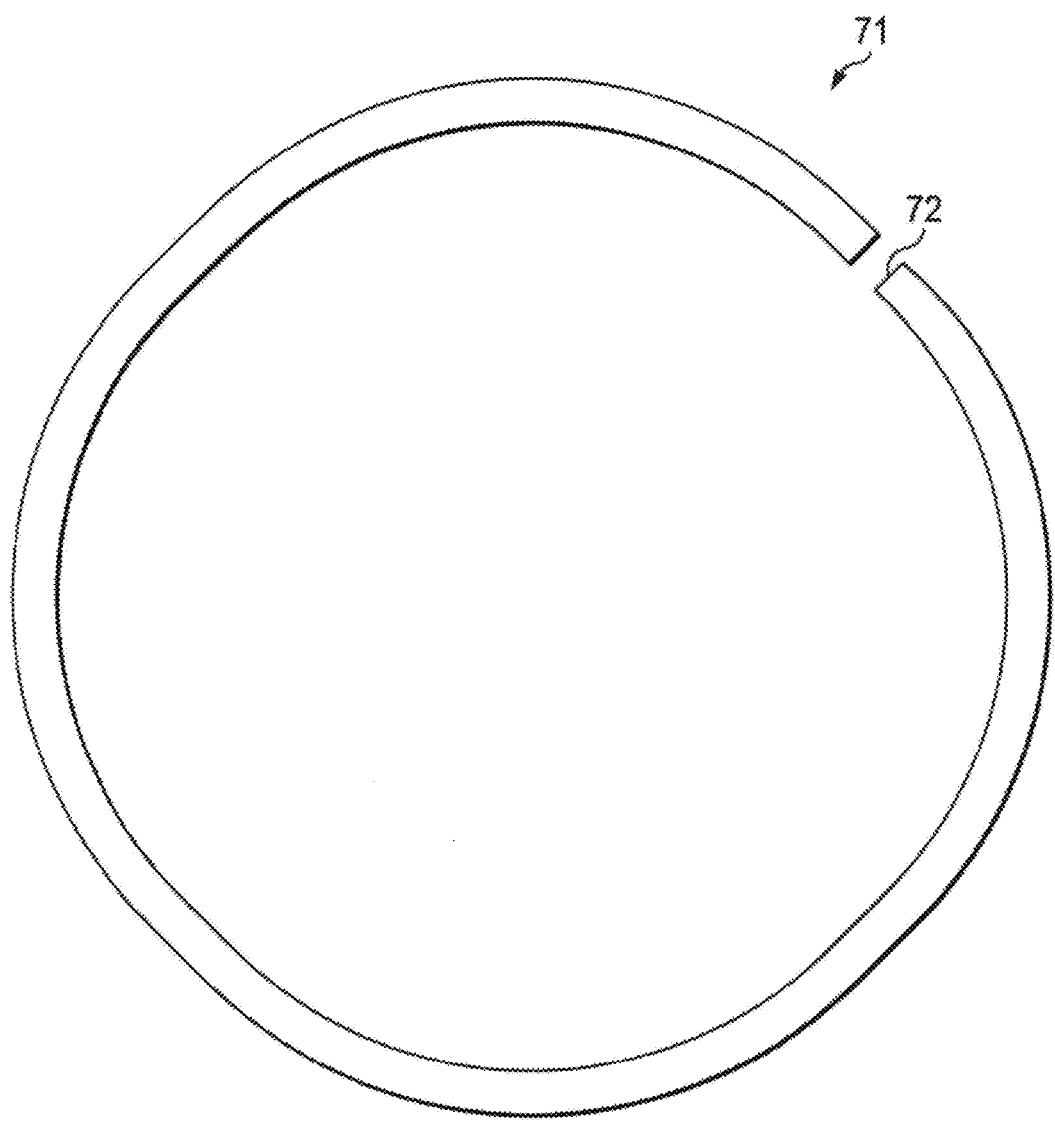
FIG. 8 is a top, perspective view of another form of the click-fit restraint ring of the invention.
Figure 9:
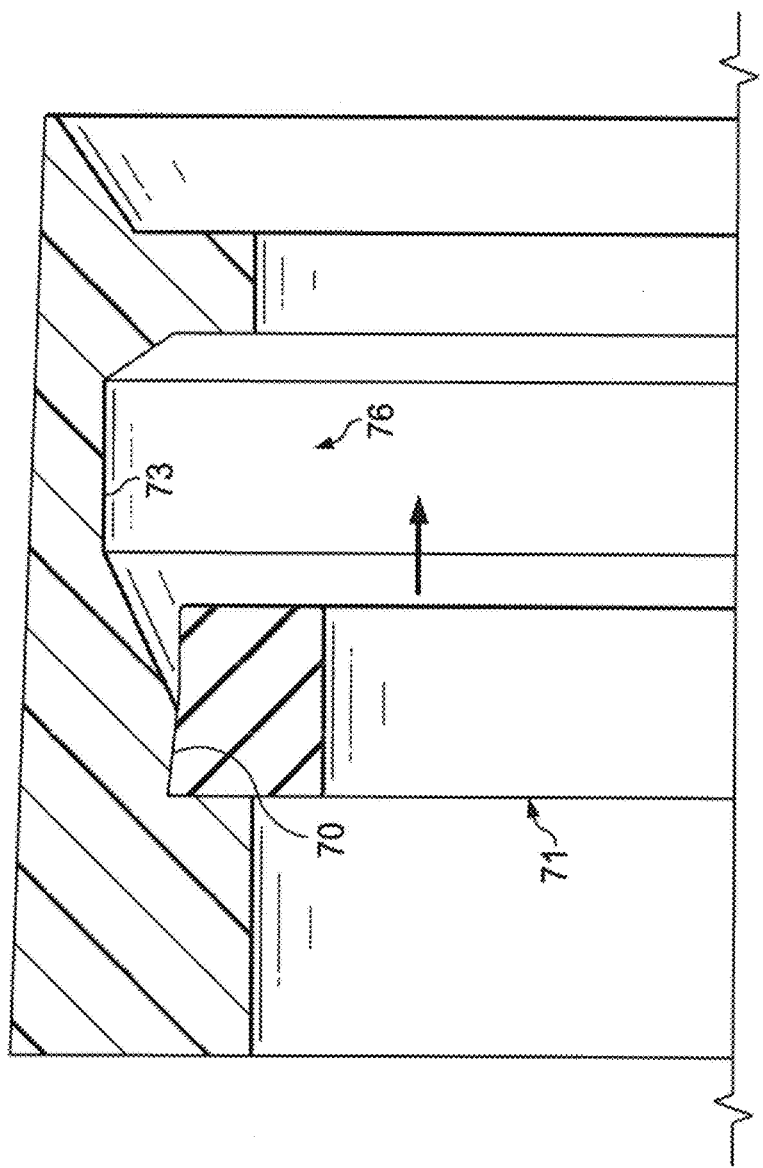
FIG. 9 is a partial, sectional view of the click-fit restraint ring of FIG. 8 in a first position within a groove provided in a casing.
Figure 10:
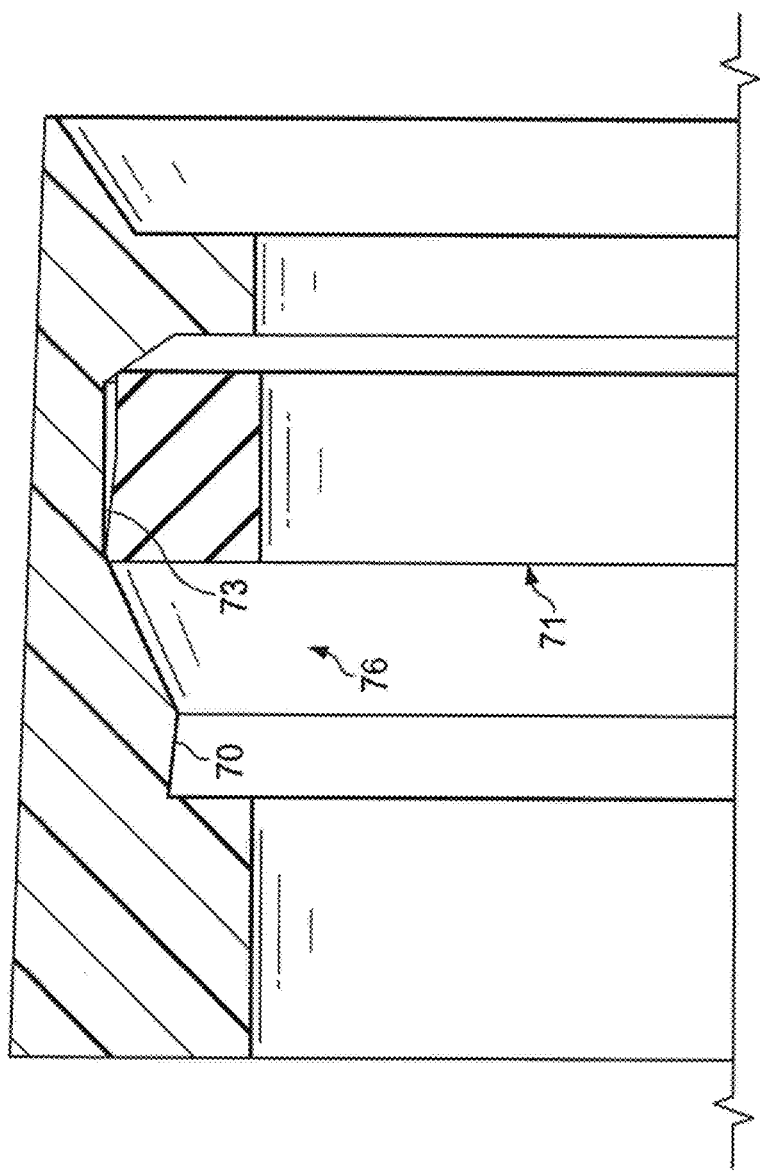
FIG. 10 is another partial, sectional view, similar to FIG. 9, but showing the click-fit restraint ring in a second position.

FIG. 8 shows a click-fit restraint ring 71 which is "non-round" in that it has the shape of a quadrilateral with round corners. It thus differs from the click-fit restraint rings shown in FIGS. 1-5A in that it does not have "lobes" creating a wavy effect. The ring has one opening 72 in the circumference thereof. It will be understood, also that the ring could be triangular, pentagonal, hexagonal, etc., depending upon the dimensional ratios of the raceways and pipe diameters. The regions of the restraint ring with maximum diameter serve to keep it centered in the deeper part of the casing groove (shown as 73 in FIG. 9). The regions of the restraint ring 71 with the minimum diameter interfere with the spigot. These regions bend outward as the spigot is inserted to admit the spigot and then drop into the spigot groove. When the spigot pulls outwardly, it drags the restraint ring into the lower part of the casing raceway (see FIG. 9) for more secure engagement. If the spigot continues pushing in, the restraint ring remains in the expanded position (see FIG. 10), in which the outer part of the lobes engage with the casing and the inner parts engage with the spigot. This is referred to as 50% engagement.

The material used to make the ring-shaped casing has typically been a plastic such as PVC, or a metal, such as stainless steel, in the prior art joining systems. However, in the present invention, the preferred casing 23 may be made of a particular type of synthetic polymeric material, such as pure PEEK or pure polyamide, PP or PET, as well as these polymeric materials which have been reinforced by glass fiber, for example, 10 to 30%, or more, glass fiber by weight. The casing polymeric materials can conveniently be injection molded or molded into blanks and machined into the desired shapes for the final casing member.

In the systems of the invention, the click-fit restraint ring can be formed of any of a number of convenient materials, generally any material can be used as long as it results in a flexible restraint ring having the memory to snap back to its original shape after being deformed. This would include metals, plastics or composites. Example materials include aluminum, steel, ductile iron, any polymer either crystalline or below its glass transition temperature having the snap back property, with or without fillers or fibers, etc., epoxies with or without filler, etc.

By way of further example, the click-fit restraint ring may preferably be made of a synthetic polymeric material such as PEEK with, for example, 10 to 30% glass fiber reinforcement. In one example, the PEEK was reinforced with 13% glass fiber (60% Vitrex 450G/40% Vitrex 450GF30). The particular materials can be chosen depending upon the desired restraining performance, but will generally have a tensile strength and modulus equal or greater than that of rigid PVC in the preferred embodiment (7,000 psi and 400,000 psi respectively).

The ring-shaped companion sealing element 25 (FIG. 1) is preferably an elastomer, as in known in the prior art. For example, the elastomeric gasket 25 can be formed of a natural or synthetic rubber or blends thereof, including, EPDM and SBR. A natural or synthetic rubber having a hardness on the order of 50 durometer has been found to provide an acceptable degree of deformability of the seal.

The following materials are merely exemplary of those which may be used in the practice of the invention:

PEEK: Polyether ether ketone (PEEK) is a colourless organic thermoplastic polymer in the polyaryletherketone (PAEK) family, used in engineering applications. PEEK is a semicrystalline thermoplastic with excellent mechanical and chemical resistance properties that are retained to high temperatures. The processing conditions used to mold PEEK can influence the crystallinity, and hence the mechanical properties. The Young's modulus is 3.6 GPa and its tensile strength 90 to 100 MPa. PEEK has a glass transition temperature of around 143° C. (289° F.) and melts around 343° C. (662° F.). Some grades have a useful operating temperature of up to 250° C. (482° F.). It is highly resistant to thermal degradation as well as attack by both organic and aqueous environments. It is attacked by halogens and strong acids as well as some halogenated compounds and aliphatic hydrocarbons at high temperatures. It dissolves completely in concentrated sulfuric acid at room temperature. Because of its robustness, PEEK is used to fabricate items used in demanding applications, including bearings, piston parts, pumps, HPLC columns, compressor plate valves, and cable insulation. It is one of the few plastics compatible with ultra-high vacuum applications. It is extensively used in the aerospace, automotive, and chemical process industries.

PET: Polyethylene terephthalate, is the most common thermoplastic polymer resin of the polyester family and is used in fibers for clothing, containers for liquids and foods, and thermoforming for manufacturing, and in combination with glass fiber for engineering resins. (Wikipedia).

Melting point: 500° F. (260° C.)
Formula: $(C_{10}H_8O_4)_n$
Density: 1.38 g/cm$^3$
Molar mass: 10-50 kg/mol, varies
Abbreviations: PET, PETE
Thermal conductivity: 0.15 to 0.24 W/(m·K)

POLYPROPYLENE: Polypropylene, is a thermoplastic polymer used in a wide variety of applications at the present time and will be well familiar to those skilled in the relevant arts. It is produced via chain-growth polymerization from the monomer propylene. Polypropylene belongs to the chemical group referred to as polyolefins and is partially crystalline and non-polar. Its properties are similar to polyethylene, but it is slightly harder and more heat-resistant. It is a naturally white, mechanically rugged material and has a high chemical resistance. Polypropylene is the second-most widely produced commodity plastic (after polyethylene).

Melting point: 320° F. (160° C.)
IUPAC ID: poly(propene)
Formula: $(C_3H_6)_n$
Classification: Polymer
Density: 0.855 g/cm³, amorphous; 0.946 g/cm³, crystalline
Strength: around 4,800 psi ugplast-inc.com
POLYAMIDE: (generic Nylon): Polyamide is a high-performance synthetic plastic, composed of a long polymer chain bonded by amide groups. The specific composition and properties of polyamide vary depending on whether it is an aliphatic, aromatic, or semi-aromatic polyamide. Polyamides are all known for their high strength, durability, chemical resistance, and low cost. Notable characteristics of polyamides are:
1. Very good chemical resistance.
2. High tensile strength.
3. Good flexibility.
4. Low creep.
5. High impact resistance.
One acceptable polyamide material has the following published characteristics:

TABLE I

| PHYSICAL PROPERTIES | ASTM/Method | Units | Values |
|---|---|---|---|
| Density | D 792 | g/cm³ | 1.14 |
| MECHANICAL | | | |
| Tensile Strength at Break | D 638 | MPa | 54 |
| Elongation at Break | D 638 | % | 20-25 |
| Flexural Strength | D 790 | MPa | 69 |
| Flexural Modulus | D 790 | MPa | 2028 |
| Izod Impact Strength, Notched | D 256 | KJ/m² | 12 |
| THERMAL | | | |
| Deflection Temperature under Load at 1.8 MPa | D 648 | ° C. | 65 |

Properties:
   Appearance (Surface color): pellet form
   Pellet Size: 3×3 (±0.3) mm
   Packing: 25 kgs per PP bag
   Storage: Keep at dry condition
   Drying Temperature: 80° C.
   Drying Time: 4 hr
   Moisture Content: 0.2%
   Processing temperature: 270 to 300° C.
   Mold Temperature: 70 to 90° C.

An invention has been provided with several advantages. The click-fit restraint system of the invention provides an improved restrained joining system for joining two sections of plastic pipe which joints can withstand anticipated forces likely to be encountered in actual field use with a very high safety factor. The components of the restraint system incorporate newer materials which offer advantages of increased tensile strengths and other desirable attributes that were not achievable with traditional nylon and PVC type pipe materials used in the past in joining component materials. The system of the invention operates in a click or snap-fit fashion, upon being actuated by the male pipe member during the assembly step, and does not require spline openings in the host plastic pipe. The joining system of the invention meets the needs of such diverse plastic pipe conduit or pipeline applications as above ground temporary water lines, forced water and sewer mains, municipal water lines, earthquake prone water distribution, well casing applications and horizontal drilling applications.

While the invention has been shown in only one of its forms, it is not thus limited but is susceptible to various changes and modifications without departing from the spirit thereof.

What is claimed is:

1. A joining system for use in assembling a restrained joint of pipe, fitting, coupling or other shape to join a first section of pipe with a second section of pipe for the purpose of conveyance of liquids, gases, or sustaining a solid, wherein the solid comprises a wire or a cable in a protected environment, the joining system comprising:
the first section of pipe having a female, belled pipe end with an end opening and having an exterior surface, an interior surface and having a circumferential recess formed in the belled pipe end adjacent the end opening on the interior surface thereof;
the second section of pipe having a mating male pipe end having an interior surface and exterior surface, and wherein the exterior surface has at least one groove formed at one circumferential location thereof which is alignable with the interior recess formed in the belled pipe end when the male pipe end is inserted within the mouth opening of the belled pipe end to form a joint;
ring-shaped casing element installed within the circumferential recess provided in the belled end of the first section of pipe, the casing element having an inner circumferential surface and an outer circumferential surface and having at least one groove formed at one inner circumferential location on the inner circumferential surface thereof;
an associated sealing element located within the circumferential recess provided in the first section of pipe adjacent the casing element, the sealing element having an inner circumferential region and an outer circumferential region, the outer circumferential region being arranged to form a seal with the interior surface of the belled end while the inner circumferential region forms a sealing surface for the exterior surface of the mating male pipe section;
a click-fit restraint ring located in the groove formed on the inner circumferential surface of the casing element, the click-fit restraint ring having a non-circular shape with a wavy pattern, the click-fit restraint ring being actuated by contact with the male pipe end as the pipe joint is made up to move between an initial relaxed state to an intermediate extended state, and finally to a collapsed state in which portions of the ring snaps into place in the groove formed on the exterior surface of the male pipe end to thereby restrain the male pipe end; and
wherein the click-fit restraint ring has a wavy pattern forming a series of spaced lobes on the circumference thereof, with selected outermost regions of the ring locating themselves in the casing groove and selected innermost regions locating themselves in the groove provided in the exterior surface of the male pipe end as assembly of the pipe joint proceeds, and wherein after assembly is complete, the innermost regions of the click-fit restraint ring drop into the groove formed on the exterior surface of the male pipe end.

2. The joining system of claim 1, wherein the pipe material is selected from among the group consisting of polyvinyl chloride (PVC), ductile iron and high-density polyethylene (HDPE).

3. The joining system of claim 1, wherein the click-fit restraint ring is a continuous ring having a wavy, irregular outer circumferential shape, the ring being formed of a material which recovers its shape after compression.

4. The joining system of claim 1, wherein the sealing element is located within the circumferential recess of the belled pipe end rearwardly of the ring-shaped casing element, the sealing element having a downwardly extending sealing region which is contacted by the exterior surface of the mating male plastic pipe during the assembly of a pipe joint.

5. The joining system of claim 1, wherein the ring-shaped casing element is formed of a material selected from the group consisting of steel or other metals, metal alloys, composite materials, plastics and hardened elastomer materials.

6. The joining system of claim 5, wherein the plastic and hardened elastomer materials comprise:
polyether ether ketone (PEEK), polyethylene terephthalate (PET), polyamide (PA) or polypropylene (PP) and glass; or
PEEK, PET, PA, or PP, wherein the PEEK, PET, PA, or PP is reinforced with carbon fiber.

7. The joining system of claim 1, wherein the click-fit restraint ring is made of:
pure polyether ether ketone (PEEK) or pure polyamide, polypropylene (PP) or polyethylene terephthalate (PET); or
PEEK, PP, or PET, wherein the PEEK, PP, or PET is reinforced with glass fiber or filler.

8. The joining system of claim 1, wherein the click-fit restraint ring has a non-circular, polygonal shape with selected regions of the restraint ring having a maximum diameter which acts to keep the ring centered in the casing groove prior to the joint make-up and selected regions of minimum diameter which interfere with the male pipe end during assembly of the joint, the regions of minimum diameter bending outward to admit the male pipe end as the assembly begins and then dropping into the groove on the exterior surface of the male pipe end as assembly proceeds to joint make-up.

9. The joining system of claim 8, wherein the click-fit restraint ring has three spaced lobes.

10. The joining system of claim 1, wherein the ring-shaped casing element has a leading edge and a trailing edge, the trailing edge being provided with a recessed profile which mates with and engages a leading nose portion of the sealing element so that while the sealing element and the ring-shaped casing element are separate elements, the sealing element and the casing element are interengaged with the leading nose portion of the sealing element extending into the concave recessed profile of the ring-shaped casing element, the interengagement serving to secure the sealing element within the interior of the circumferential recess.

11. The joining system of claim 10, wherein the groove formed on the inner circumference of the ring-shaped casing element includes a first region of greater relative depth which is joined to a sloping ramp region.

12. The joining system of claim 1, further comprising a second ring-shaped casing element and a second, non-circular click-fit restraint ring, wherein:
the at least one groove of the mating male pipe includes a first groove and a second groove, the first groove containing the non-circular click-fit restraint ring, and the second groove containing the second, non-circular click-fit restraint ring; and
the second ring-shaped casing element is located in the interior of the female belled pipe end, further wherein the second ring-shaped casing element comprises a first raceway and a second raceway formed on an interior circumferential surface thereof, and further wherein the first raceway receives the non-circular click-fit restraint ring, and the second raceway receives the second, non-circular click-fit restraint ring.

13. The joining system of claim 12, wherein both the belled pipe end and the spigot pipe end are beveled such that the click-fit restraint ring and the second click-fit restraint ring compress during insertion of the spigot and snap into place when the grooves in the belled pipe end and the spigot pipe end are aligned.

14. The joining system of claim 13, wherein the first and second grooves and first and second click-fit restraint rings are designed so that there is no compression and there is no interference with either the bell or spigot during assembly.

15. A joining system for use in assembling a restrained joint of pipe, fitting, coupling or other shape to join a first section of pipe with a second section of pipe for the purpose of conveyance of liquids, gases, or sustaining a solid, wherein the solid comprises a wire or a cable in a protected environment, the joining system comprising:
the first section of pipe having a female, belled pipe end with an end opening and having an exterior surface, an interior surface and having a circumferential recess formed in the belled pipe end adjacent the end opening on the interior surface thereof;
the second section of pipe having a mating male pipe end having an interior surface and exterior surface, and wherein the exterior surface has at least one groove formed at one circumferential location thereof which is alignable with the interior recess formed in the belled pipe end when the male pipe end is inserted within the mouth opening of the belled pipe end to form a joint;
a ring-shaped casing element installed within the circumferential recess provided in the belled end of the first section of pipe, the casing element having an inner circumferential surface and an outer circumferential surface and having at least one groove formed at one inner circumferential location on the inner circumferential surface thereof;
an associated sealing element co-located within the circumferential recess provided in the first section of pipe adjacent the casing element, the sealing element having an inner circumferential region and an outer circumferential region, the outer circumferential region being arranged to form a seal with the interior surface of the belled end while the inner circumferential region forms a sealing surface for the exterior surface of the mating male pipe section;
a click-fit restraint ring located in the groove formed on the inner circumferential surface of the casing element, the click-fit restraint ring having a non-circular shape with a wavy pattern, the click-fit restraint ring being actuated by contact with the male pipe end as the pipe joint is made up to move between an initial relaxed state to an intermediate extended state, and finally to a collapsed state in which portions of the ring snaps into place in the groove formed on the exterior surface of the male pipe end to thereby restrain the male pipe end; and
wherein the click-fit restraint ring has a polygonal shape with selected regions of the restraint ring having a maximum diameter which acts to keep the ring centered in the casing groove prior to the joint make-up and selected regions of minimum diameter which interfere with the male pipe end during assembly of the joint, the regions of minimum diameter bending outward to admit the male pipe end as the assembly begins and then dropping into the groove on the exterior surface of the male pipe end as assembly proceeds to joint make-up.

16. The joining system of claim 15, wherein the click-fit restraint ring comprises a plurality of spaced lobes.

17. The joining system of claim 16, wherein the plurality of spaced lobes comprises three spaced lobes.

* * * * *